US006607140B1

(12) United States Patent
Hartman

(10) Patent No.: US 6,607,140 B1
(45) Date of Patent: Aug. 19, 2003

(54) METHOD FOR PRECISE ELECTRIC ACTUATOR CONTROL WITH REDUCED REPOSITIONING

(76) Inventor: Thomas B. Hartman, 9905 39th Dr. NE, Marysville, WA (US) 98270

( * ) Notice: Subject to any disclaimer, the term of this patent is extended or adjusted under 35 U.S.C. 154(b) by 0 days.

(21) Appl. No.: 10/079,442

(22) Filed: Feb. 19, 2002

Related U.S. Application Data

(63) Continuation of application No. 09/564,348, filed on May 4, 2000, now Pat. No. 6,352,106.
(60) Provisional application No. 60/133,204, filed on May 7, 1999.

(51) Int. Cl.[7] .................. G05D 15/00; G05D 23/00
(52) U.S. Cl. ...................................... 236/780
(58) Field of Search ................. 236/78 D, 75, 236/78 C; 318/609; 700/41

(56) References Cited

U.S. PATENT DOCUMENTS

| | | | |
|---|---|---|---|
| 3,780,532 A | 12/1973 | Norbeck et al. ............ 62/201 |
| 4,085,594 A | 4/1978 | Mayer ........................ 62/171 |
| 4,252,751 A | 2/1981 | Shito ......................... 261/26 |
| 4,282,718 A | 8/1981 | Kountz et al. ............... 62/115 |
| 4,327,559 A | 5/1982 | Spethmann .................. 62/179 |
| 4,474,027 A | 10/1984 | Kaya et al. .................. 62/171 |
| 4,495,777 A | 1/1985 | Babington .................. 62/185 |
| 4,547,977 A | * 10/1985 | Tenedini et al. ........ 236/78 D X |
| 4,554,964 A | 11/1985 | Awano et al. ................ 165/39 |
| 4,589,060 A | 5/1986 | Zinsmeyer .................. 364/148 |
| 4,656,835 A | * 4/1987 | Kidder et al. ......... 236/78 D X |
| 4,932,218 A | 6/1990 | Robbins ...................... 62/171 |
| 4,936,107 A | 6/1990 | Kitagaki et al. ............. 62/184 |
| 5,040,377 A | 8/1991 | Braun et al. ................. 62/183 |
| 5,070,704 A | 12/1991 | Conry ........................ 62/175 |
| 5,127,576 A | * 7/1992 | Weatherhead et al. 236/78 C X |
| 5,138,844 A | 8/1992 | Clanin et al. ................ 62/89 |
| 5,309,727 A | 5/1994 | Duff et al. ................... 62/117 |
| 5,385,030 A | 1/1995 | Kitagawa et al. ............ 62/160 |
| 5,425,503 A | 6/1995 | Corso ......................... 237/63 |
| 5,600,960 A | 2/1997 | Schwedler et al. ........... 62/99 |
| 5,626,025 A | 5/1997 | Hyde .......................... 62/117 |
| 6,352,106 B1 | * 3/2002 | Hartman ..................... 165/293 |

OTHER PUBLICATIONS

"KT™ 6300, 6400 Split–core kW/kWH Transducers . . . Enercept KT™", Veris Industries Inc. Power Transducers Specification Sheet.
"FP5—Energy Saving Inverter for Fan and Pump Applications," Saftronics Brochure, PN 027–2004, rev 12/96.
"VLC–853C3 BACtalk Alerton Programmable VisualLogic Controller," Alerton Technologies Specification Sheet, LTBT–VLC853C3, 1/97.
"H–720 High Accuracy 4–20 mA Output," Veris Industries Inc. Analog Current Sensors Specification Sheet.

* cited by examiner

Primary Examiner—William Wayner
(74) Attorney, Agent, or Firm—Stoel Rives LLP

(57) ABSTRACT

The present invention encompasses systems and methods for enabling electronically actuated valves to operate reliably and precisely with prolonged life by achieving effective control with less-frequent reposition requirements. A time interval is selected at which position command signals will be received. When a position command signal is received for a valve, a check is made to determine if the absolute value of the sum of differences between each position command signal (since the last repositioning of the valve) and the actual current position of the valve exceeds a preset threshold. If it does, the valve is repositioned according to the most recently received position command signal. If the absolute value sum of the differences does not exceed the preset threshold, the valve is not repositioned, but the value of the absolute value sum of the differences is stored in memory. At the next time interval for receiving position command signals, a next position command signal is received and the process repeats. Once the threshold is exceeded, the valve is repositioned according to the most recent position command value, and the absolute value of the sum of differences is reset to zero.

9 Claims, 6 Drawing Sheets

METHOD FOR PRECISE ELECTRIC ACTUATOR CONTROL WITH REDUCED REPOSITIONING

RELATED APPLICATIONS

This Application is a continuation-in-part of U.S. patent application Ser. No. 09/564,348, filed May 4, 2000, now U.S. Pat. No. 6,352,106, which claims priority from U.S. Provisional Patent Application No. 60/133,204, filed May 7, 1999, each of which are incorporated by reference herein in their entirety.

COPYRIGHT NOTICE

© 2003 The Hartman Company. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d), (e).

TECHNICAL FIELD

This invention pertains to the field of heating, ventilation, and air conditioning and, more specifically, to an improved method for repositioning electric actuators of the type employed in modulating valves that control fluids, or other modulating equipment that employ electric actuators.

BACKGROUND OF THE INVENTION

This invention pertains to systems in which the flow of a fluid, such as water or air, is intended to be regulated so as to meet a particular condition, such as a variable thermal load or other condition that requires continuously regulated, variable positioning. Typical applications include fluid distribution systems in which a continuously regulated flow is required through multiple devices that serve multiple thermal loads, each with the capacity to continuously adjust the flow.

Such a system is shown in FIG. 1. In FIG. 1, a fluid distribution system serves a number of loads, A through N, each of which employs a modulating valve 111A through 111N and a modulating valve actuator 116A through 116N, each operated by a controller 120A through 120N that is capable of sending a valve position command signal through an electrical connection 117A through 117N. The purpose of the valve position command signal is to adjust the fluid flow through the load to meet the current load requirements. A load can be any end device or equipment that is served by the fluid distribution system.

The flow of fluid (water, for example) through each outlet is regulated to control the flow of chilled or heated water through a coil 114A through 114N, which conditions air that is being circulated from space through the coil by a fan 118A through 118N. For water distribution systems, the valve can be installed on the inlet to the load or the outlet from the load, but is usually installed on the outlet as shown in FIG. 1 to reduce the noise of the water in the coil, which would be transferred to the air. Positioning of the valve on the load outlet is also preferred to reduce the temperature extremes to which the valve is exposed. In this application, the opening of each water control valve is modulated to maintain a specific temperature of air being supplied to the space as measured by a supply air temperature sensor 122A through 122N or to maintain some other parameter that requires continuously adjustable flow through the load. The temperature of the space is often regulated by another temperature sensor 124A through 124N that is located in an enclosed area or space 128A through 128N, or as required to sense the temperature and, therefore, load condition of the space. When employed to modulate heating or cooling water for commercial processes, the configuration of FIG. 1 may vary slightly. The method of obtaining a position command signal to position a load valve for space or process thermal control is well known and not a subject of this invention.

Such a fluid distribution system may be quite extensive, serving an entire building, or sometimes multiple buildings. To ensure that an adequate flow of fluid, which may be water, air, or another fluid, is supplied at all times to all loads, the prime mover, in this instance one or more electrically driven centrifugal pumps 150 that circulate water through a closed circuit that is heated or cooled by a heat exchanger 158 or some other means, is often operated by a variable speed drive 154. Pump motor speed is adjusted by a digital or other type controller 156 to maintain a differential pressure between a water supply header 162 and water return header 166, using a differential pressure sensor 168. The differential pressure sensor is typically installed at, or very near, the end of the distribution system to ensure the design fluid pressure is maintained at a minimum setpoint value throughout the distribution circuit.

FIG. 1 is typical of the type of hydronic pumping systems that are employed to distribute heated or chilled water to systems within buildings, or to multiple buildings in a campus type arrangement. The distribution system in FIG. 1 serves a total of "N" loads, but only the first (A) and the last (N) are shown. Flow to each device is regulated by some thermal sensing means linked to a controller that sends position command signals to the actuator that operates a modulating valve. The pump(s) is (are) controlled by one or more differential pressure sensor(s) at or near the end of the distribution pumping main(s). This method of regulating pump operation is also well known and not a subject of this invention.

In such systems, each valve is modulated within a range to meet the flow capacity of the device to which it is connected. For example, if, as in FIG. 1, the device is a heating or cooling coil in an air supply system for comfort conditioning, the valve may be modulated to maintain a specific air temperature into the space served by the device. As the load in the space changes due to loads external or internal to the space, the space temperature sensor senses the change in space temperature and control logic is employed to adjust the valve in order to change the temperature of the air supply to the space. In other applications, the control valve may be modulated to maintain parameters other than air discharge or space temperature. In present art, the control devices 120A through 120N send periodic position command signals to the respective device actuators 116A through 116N to maintain each load with respect to a controlled variable, in the case of this example, a supply air temperature to the space or area where thermal condition is being controlled. The frequency of position command signals varies among products and applications and there is no standard for setting how often a reposition of a valve or other device is made. Some individuals recommend reposition intervals of less than several seconds. For example, Burt Rishel, a Fellow of the American Society of Heating, Refrigeration, and Air Conditioning Engineers (ASHRAE), recommends an interval of less than two seconds for modulating heating and cooling valve actuation. Rishel's recommendation is contained in an article that appeared in the November 1998 issue of the ASHRAE JOURNAL. Many controllers employ a limited range of position command signal calculations. For example, Siemens "MBC" controllers which are widely employed for heating, ventilating and air conditioning systems have an allowable range of reposition intervals for the controller modules of from 1 to 15 seconds. This range of position command signal calculations is typical of many manufacturers and applications. A repositioning calculation nearly always results in a slightly different position command signal sent to the actuator of the valve or other device, because most calculations are quite complex and include a time based (integral) error signal as well as proportional error signal. The calculation in digital controllers is quite precise, usually accurate to at least one decimal place. Therefore, except for with an exceptionally stable application, a slightly new position command signal will be issued from the controller to the actuator that operates the valve or other device nearly every time the repositioning calculation is made.

When equipment must operate continuously and new position command signals occur once every second, the actuator will have been subject to more than 5,000,000 repositions in two months. If the positioning command signal is issued once every 15 seconds, the actuator will be subjected to more than 5,000,000 repositions in less than 30 months. Many electric actuators have a designed life expectancy of approximately 5,000,000 repositions. For example the Siemens model GDE/GLB Series actuator technical instructions 155-188P25 state that the actuator is designed for a life cycle of 5,000,000 repositions at rated torque and temperature.

Thus, when operated continuously and repositioned at typical intervals of from 1 to 15 seconds, such actuators have an expected life of between approximately 2 and 30 months. This short life expectancy range has been the cause of maintenance problems in certain applications. To increase the life expectancy, some actuators have incorporated logic that causes position command signals to be ignored if the difference between the current actuator position and the new position command signal is below a certain threshold value. This approach reduces the ultimate precision of actuation in order to increase the life span of the electric actuator—for example, if an actuator is 50% open and the prior art threshold value is 5%. If the command changes to 53%, the valve will not be repositioned. If successive commands remain at 53%, the valve will not move no matter how long the command remains at 53%. Thus, the precision of the valve suffers because of the constant difference between the valve position and the command value. Only when the signal moves up to more than 55% or less than 45% would the actuator move. It is the conflict between actuation precision and prolonged actuator life that the present invention is intended to solve.

SUMMARY OF THE INVENTION

One aspect of the present invention enables electronically actuated valves to operate reliably with prolonged life by achieving effective control with less-frequent reposition requirements. The present invention also encompasses a method for determining when to reposition an electronic actuator that enables less-frequent valve repositions when repositioning commands are small. By including a variable time interval and a new method of determining when a minimum threshold of change between repositions is met or exceeded, the expected life of the electronic valve actuator is extended.

Consistent with the present invention, a time interval is selected at which repositioning command signals will be received. When a position command signal is received for a valve, a check is made to determine if the absolute value of the sum of reposition commands since the last repositioning of the valve exceeds a preset threshold. If it does, the valve is repositioned according to the most recently received reposition command. If the absolute value of the sum does not exceed the threshold, the valve is not repositioned, but the value of the most recent reposition command is added to memory. At the next time interval, a next repositioning command is received. This next command is added to the prior repositioning command values stored in memory since the previous valve repositioning, and the analysis is repeated with the absolute value of this new sum. After the valve is repositioned, the sum of reposition commands is reset to zero.

Additional aspects and advantages of this invention will be apparent from the following detailed description of preferred embodiments thereof, which proceeds with reference to the accompanying drawings.

DETAILED DESCRIPTION OF PREFERRED EMBODIMENTS

Figure 2:
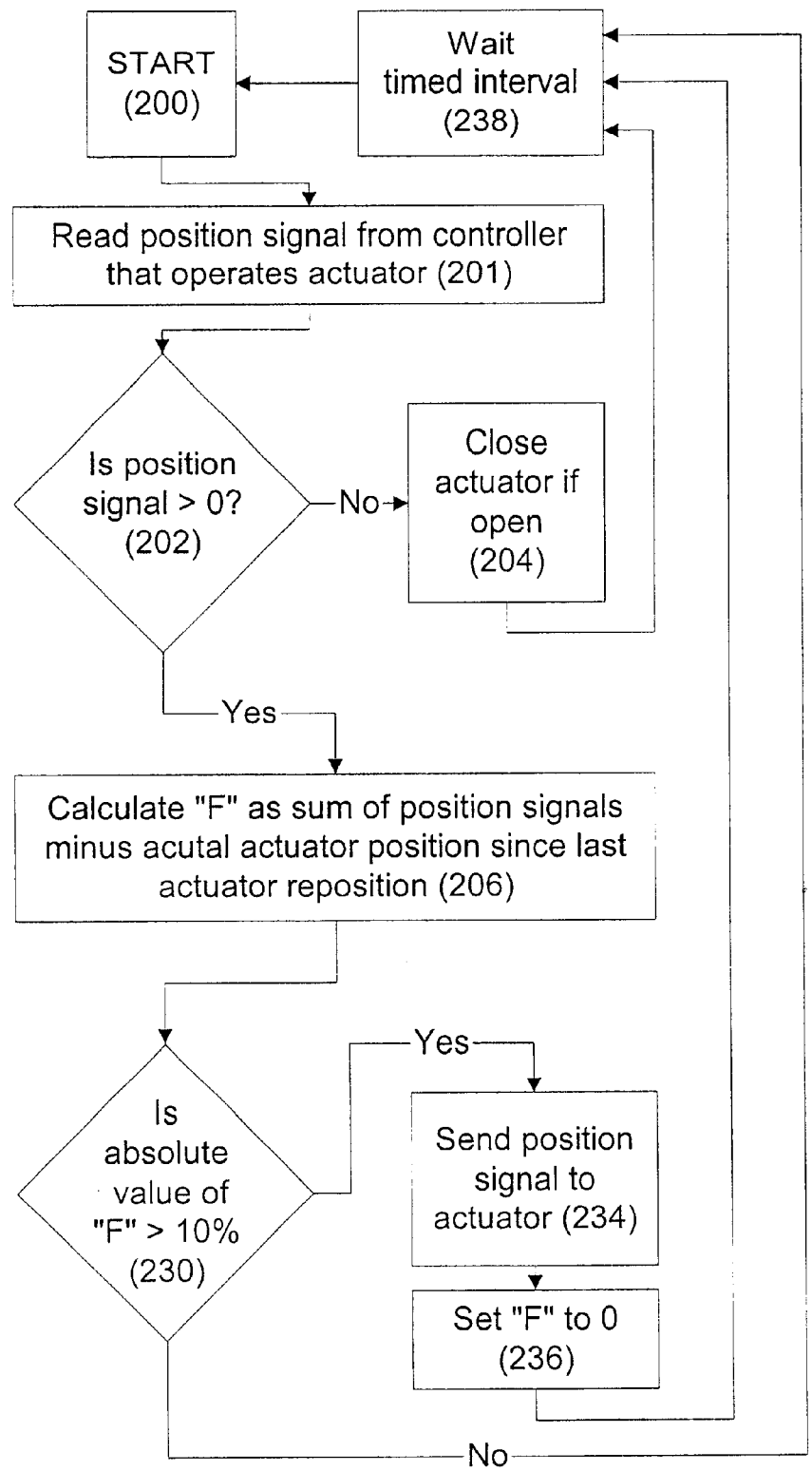
FIG. 2 is a flow chart showing logic employed to reduce actuator repositioning using s method consistent with the present invention.

A preferred embodiment of the present invention is directed to assisting electronically activated valves to operate reliably and with long life by achieving effective control with less-frequent reposition requirements. FIG. 2 presents a logic diagram for an actuator that operates with a repositioning method consistent with the present invention. In FIG. 2, the logic is executed from the start 200 at each timed interval 238. The interval may be fixed or adjustable for the actuator and is typically approximately 30 seconds (or preferably with a range of from 2 seconds to 60 seconds).

The first step each time the logic is executed at the time interval is to read the position command signal from the controller that is operating the actuator 201. The position command signal can be in the form of a variable DC voltage, usually 0 to 10 volts input to the actuator, or it can be a variable current, a digitized value received over a network connection to the controller or by some other means. The next step is an initial decision 202 as to whether the actuator position command signal from the controller is greater than zero. If the position command signal is greater than zero, then the controller is being operated to achieve its desired function, for example heating or cooling a space. If the position command signal is not greater than zero, the actuator is returned to its off position 204 if it is not now at that position and the routine is paused for the timed interval 238 before restarting.

If the new position command signal is greater than zero, then a value "F" is calculated which is the sum of the difference between the position command signals and the actual actuator position since the last time the actuator has been repositioned 206. Next, the value "F" is tested to see that it is more than a specific absolute value threshold 230. Typically this test threshold is 10% of the total actuator range, but it can be more or less, or it can be adjustable, as required in the particular application. If the value of "F" is greater than this threshold, then the actuator is repositioned in accordance with the current position command signal from the controller 234 and the value "F" is reset to zero 236. If it is not, the "F" value is stored in memory, but no repositioning action is taken and the logic is returned to the interval delay 238 and then the start point 200, at which point it accepts the next position command signal from the controller. Thus, no action is taken until the absolute sum of the reposition command signals since the last actual reposition is greater than a preset threshold value. This reduces the number of valve repositions required and eliminates hunting near the setpoint, while at the same time ensuring that precise control is obtained. Threshold numbers greater or less than 10% could alternatively be used depending on the specific application of the actuator.

If the sum of the position command signals less the actual position 230 totals more than the selected, preset threshold (e.g., 10%), a reposition command is sent to the actuator 234 and "F," the sum of the reposition signals, is reset to zero 236. The actual value of the reposition command sent to the actuator is the last position command signal received. For example, if the first new position command signal received since the last actual actuator reposition is 5% greater than the present position, the actuator is not repositioned (because the sum of the differences between the current position signal from the controller and the actual actuator position is now less than 10%). However, the 5% value is stored as the current value of "F." If the next position command signal from the controller is 7% greater than the present position of the actuator, the actuator will be repositioned to a position 7% greater than its present position because the value of "F" has now been increased to 12%, which is greater than the threshold of 10%. If "F," the absolute sum of the difference between the position command signals from the controller and the current actuator position does not exceed the threshold value (10% or as set for the actuator), no reposition signal is sent to the actuator during that program execution and the actuator remains in its current position. Once an actuator reposition has been made, the value of "F" is reset to zero.

This new method is especially useful in reducing repositions when a system is operating very near its setpoint. In these conditions, subsequent position command signals from the controller very often alternate from a slightly greater position to slightly less position. For example, if the actuator has just been repositioned to 50% and the next position command signals received by the logic are in sequence 55%, 48%, 48%, 49%, 52%, 51%, 49%, 48%, 53%, 47%, the actuator will not move at all, as the absolute sum of these position command signals less the current actuator position is zero. Such a string indicates that the setpoint is very nearly achieved at each calculation and the logic in the actuator that limits the repositioning under these circumstances results in smoother control as well as extended actuator life.

Figure 3:
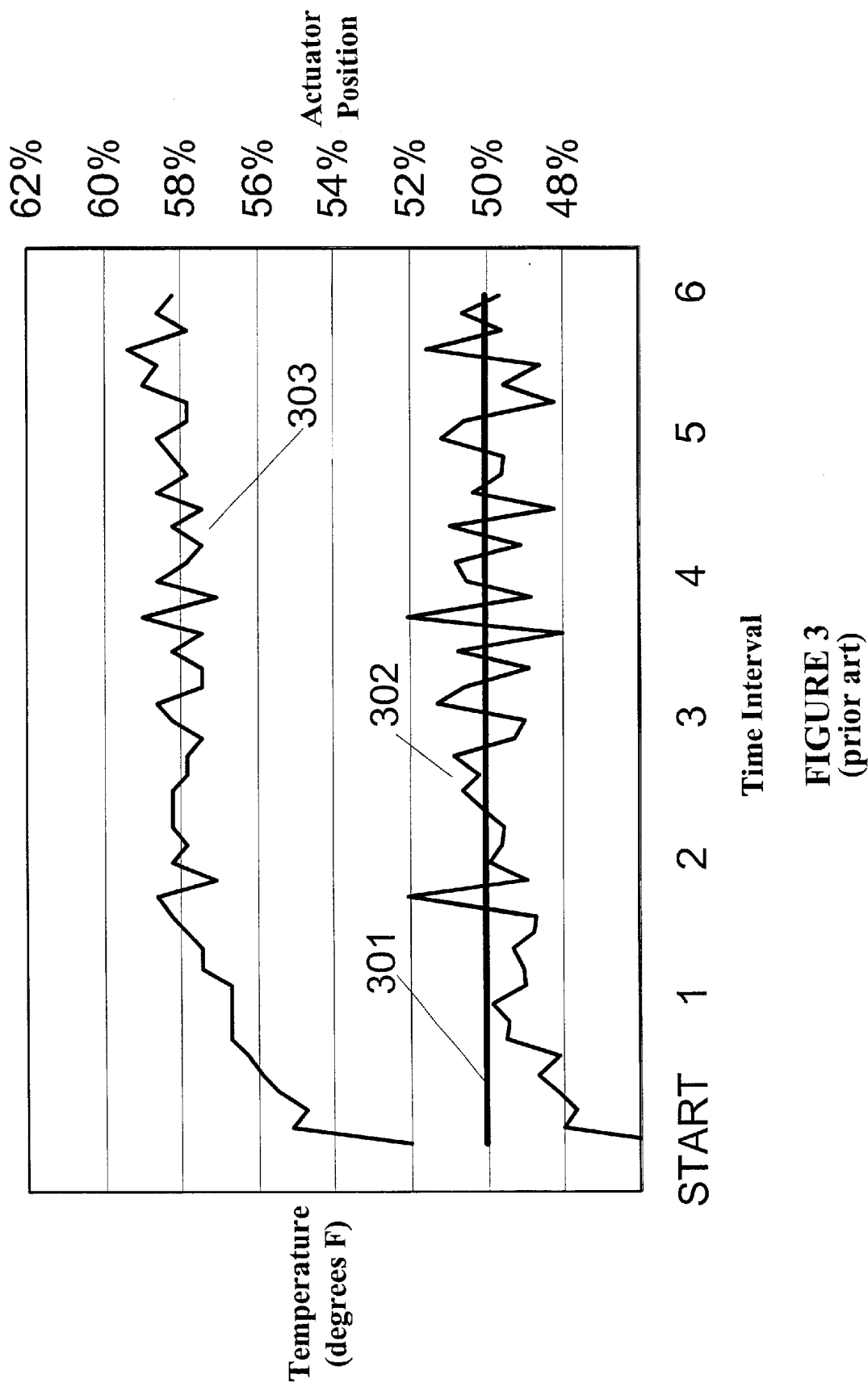
FIG. 3 is a simulated test of a valve that may be incorporated in a prior art system, such as shown in FIG. 1, in which the actuator is repositioned each time a new position command signal is received from the controller that operates the valve and actuator.

To conceptually illustrate the benefits of this invention, FIG. 3 shows in graphical form the problem this invention solves. FIG. 3 shows closed loop control in a typical heating, ventilating, and air conditioning application. In this instance, an actuator is employed to operate a fluid control device such as a valve to maintain a temperature of air into a space. An external controller is employed to provide proportional plus integral closed loop control of the actuator with the air temperature as the controlled variable. The air temperature setpoint 301 is unchanged throughout the time span of this test simulation, but certain innate system instabilities or limitations in the controllability of the controlling device or combinations of these and other factors usually make it impossible to achieve the exact temperature setpoint at all times. Instead, cycling of the air temperature 302, the controlled variable, around the setpoint is the usual occurrence as shown in FIG. 3. The controller reacts to the cycling by transmitting small position command signal changes 303 to the actuator as the air temperature changes from one sampling interval to the next. The result is the excessive actuator repositioning shown in FIG. 3. Only when line 303 remains horizontal for several brief periods is the actuator not being repositioned.

Figure 4:
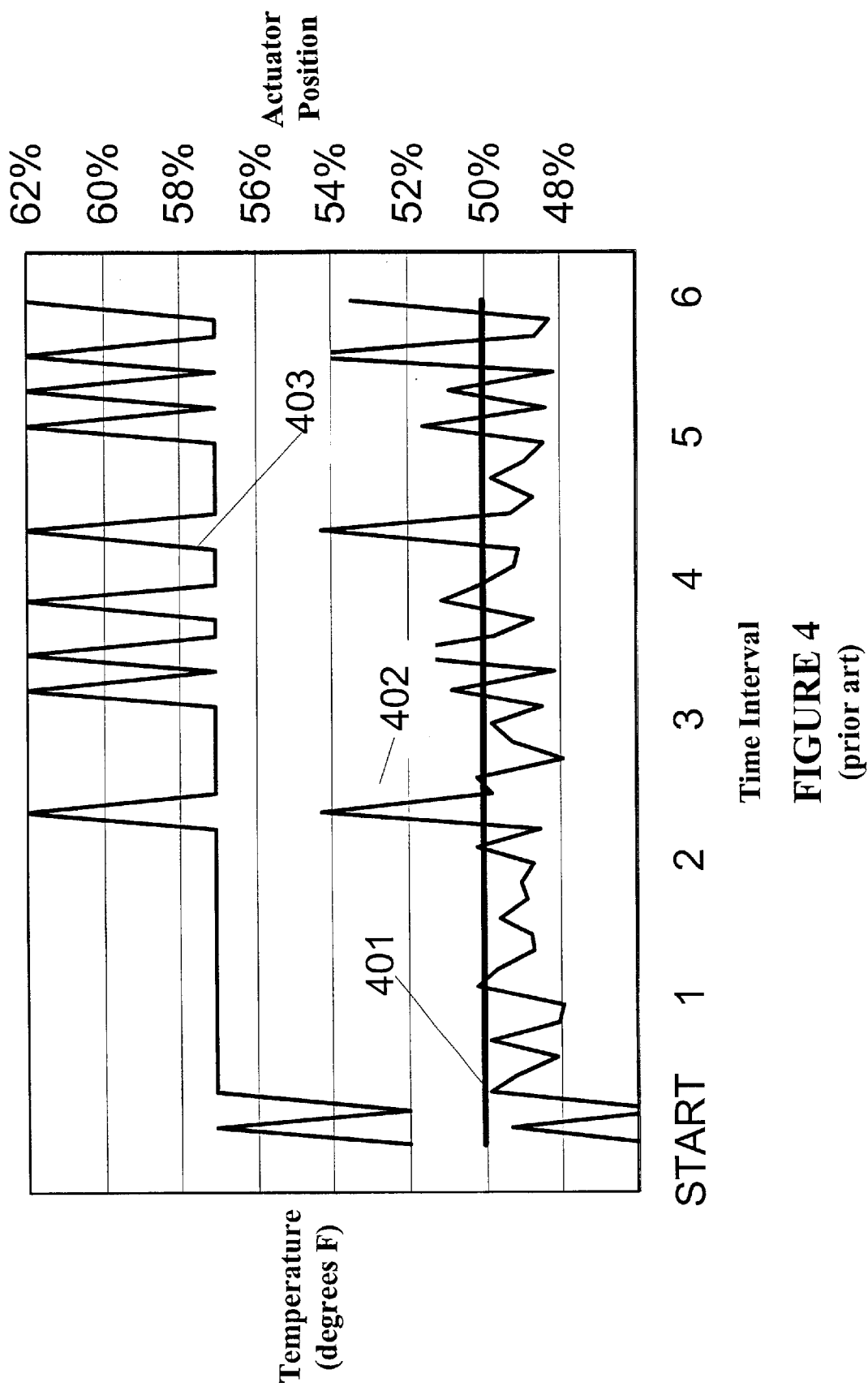
FIG. 4 is a simulated test of a prior art system employed to reduce actuator repositions wherein the repositions are limited to occurring only when the new position command signal from the controller is at least a preset amount (5%) greater or lower than the present position of the actuator that operates the valve. All other controller and system parameters in FIG. 4 are identical to those in FIG. 3.

To alleviate this excessive repositioning, prior art systems limit actuator repositioning by requiring a new position command signal to be a certain value more than the current actuator position before the actuator is repositioned. The effect of this on the FIG. 3 control is conceptually illustrated in FIG. 4. FIG. 4 shows the same closed loop control as in FIG. 3 except the actuator employs a repositioning limiting feature such that the actuator will not change position unless the new position command signal varies at least 5% or more from the current actuator position. The air temperature is again the controlled variable. The air temperature setpoint 401 remains unchanged throughout the time span, but the same system instabilities and limitations in the controllability of the controlling device are applied to this test. Longer horizontal distances of the actuator position 403 demonstrate that the repositioning is decreased with this strategy, but several occurrences of high error of the air temperature 402 from the setpoint 401 show that this strategy also reduces the precision of control.

Figure 5:
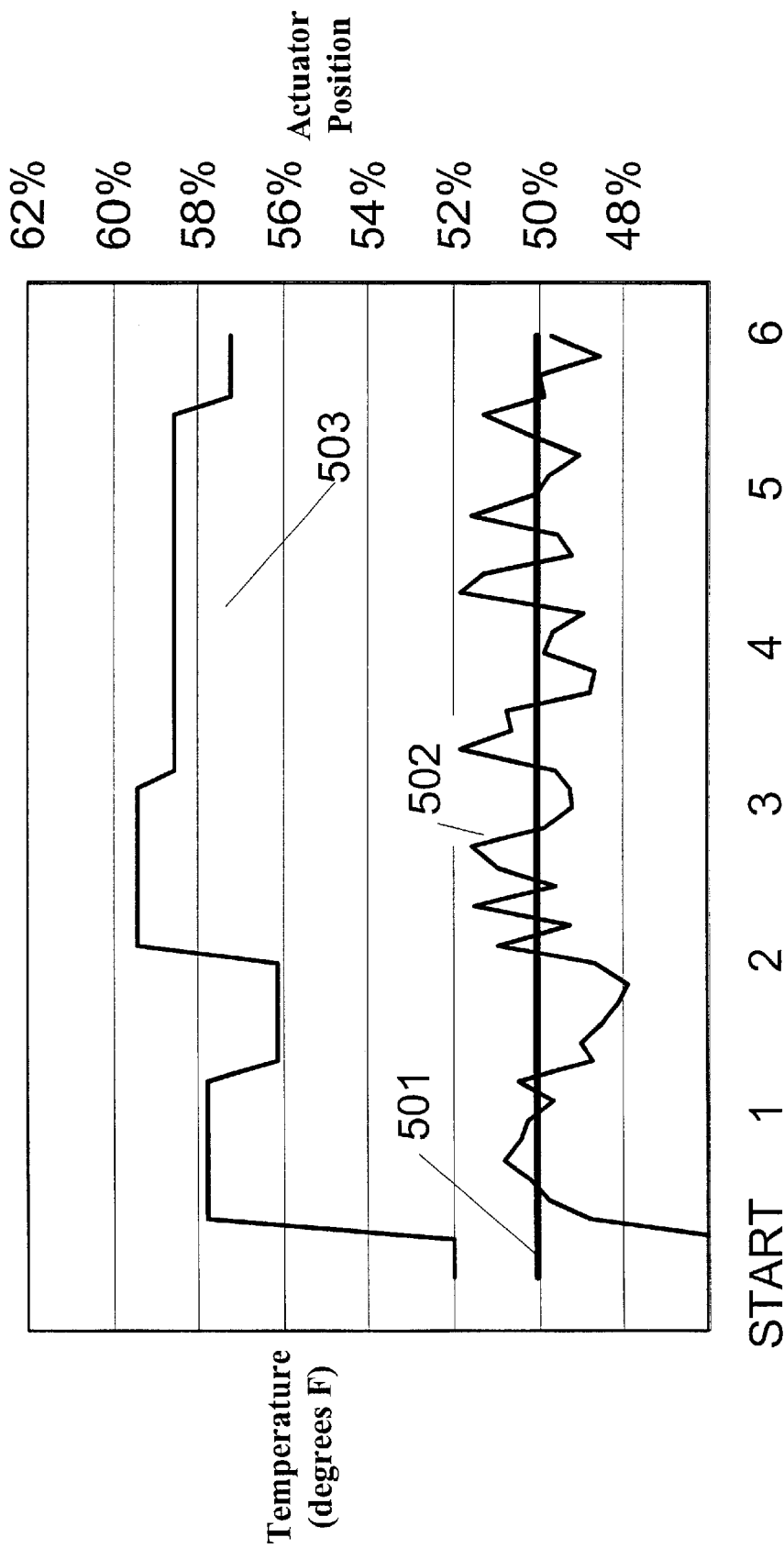
FIG. 5 is a simulated test of a new method disclosed in this invention in which the logic shown in FIG. 2 is incorporated into the actuator that operates the valve or other device so that the actuator accepts new position command signals only at preset intervals, and repositions are further reduced by requiring the sum of the position command signals from the controller minus the current actuator position to equal at least a preset threshold (e.g., +/−10%) before a reposition is made. All other controller and system parameters in FIG. 5 are identical to those in FIG. 3 and FIG. 4.

A method that is the subject of this invention is shown with a test conceptually illustrated in FIG. 5. Like the earlier figures, all system and controller parameters are the same except that in FIG. 5, actuator repositioning is operated according to logic shown in FIG. 2, wherein the position command signals are taken intermittently and repositioning is delayed until the sum of the differences between the position command signals from the controller and the present actuator position is at least 10% of the actuator range. The extensive horizontal lengths of the actuator position 503 demonstrate that this strategy requires far less repositioning than the prior art employed in FIG. 4. Also, it can be seen from the air temperature plot 502 that the controlled variable is not subject to the occurrences of high error that occur with the prior art that is shown in FIG. 4.

Figure 1:
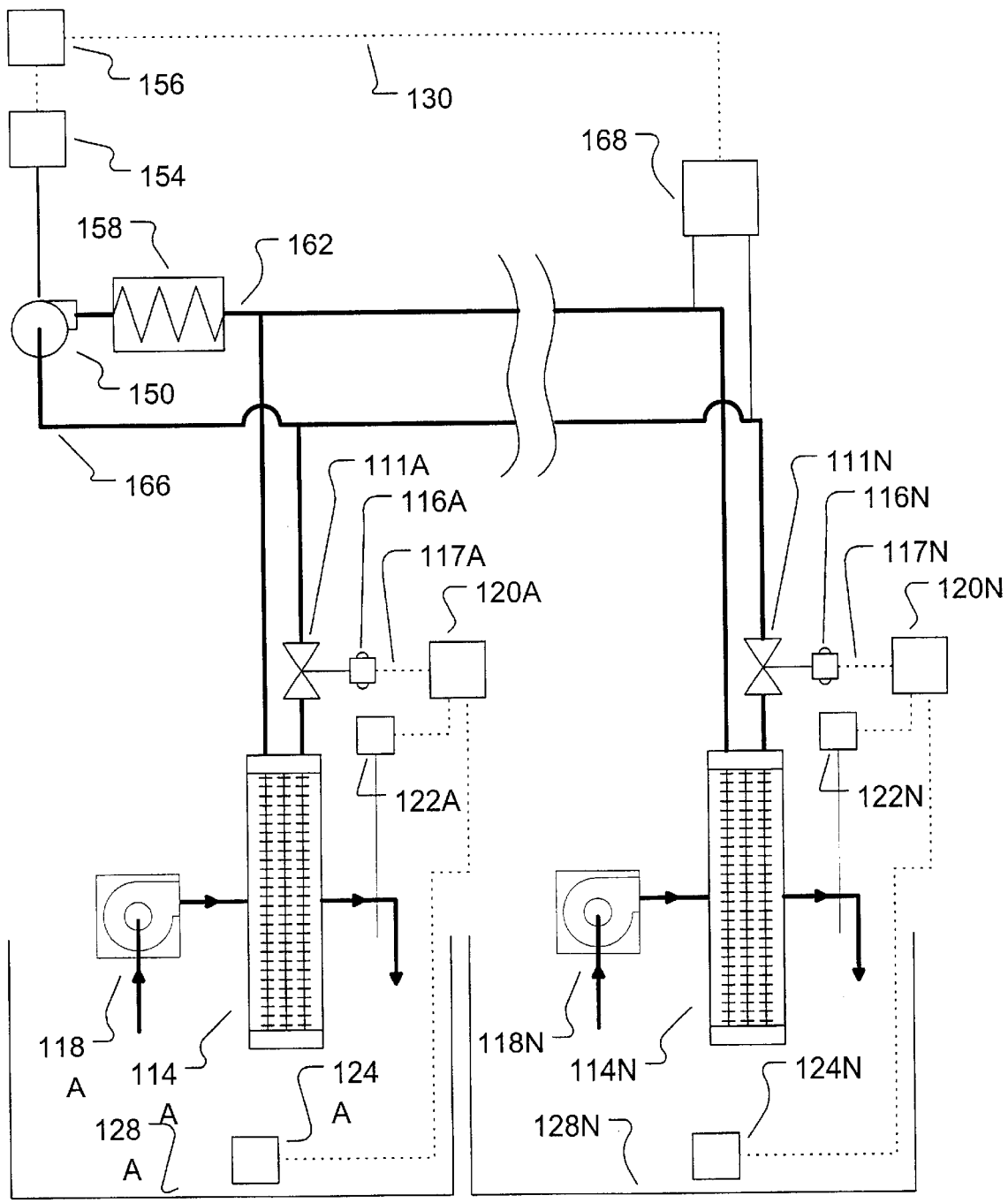
FIG. 1 is a schematic of hydronic pumping typical of the prior art wherein cooling or heating is controlled to individual loads by a fluid valve and actuator.
Figure 6:
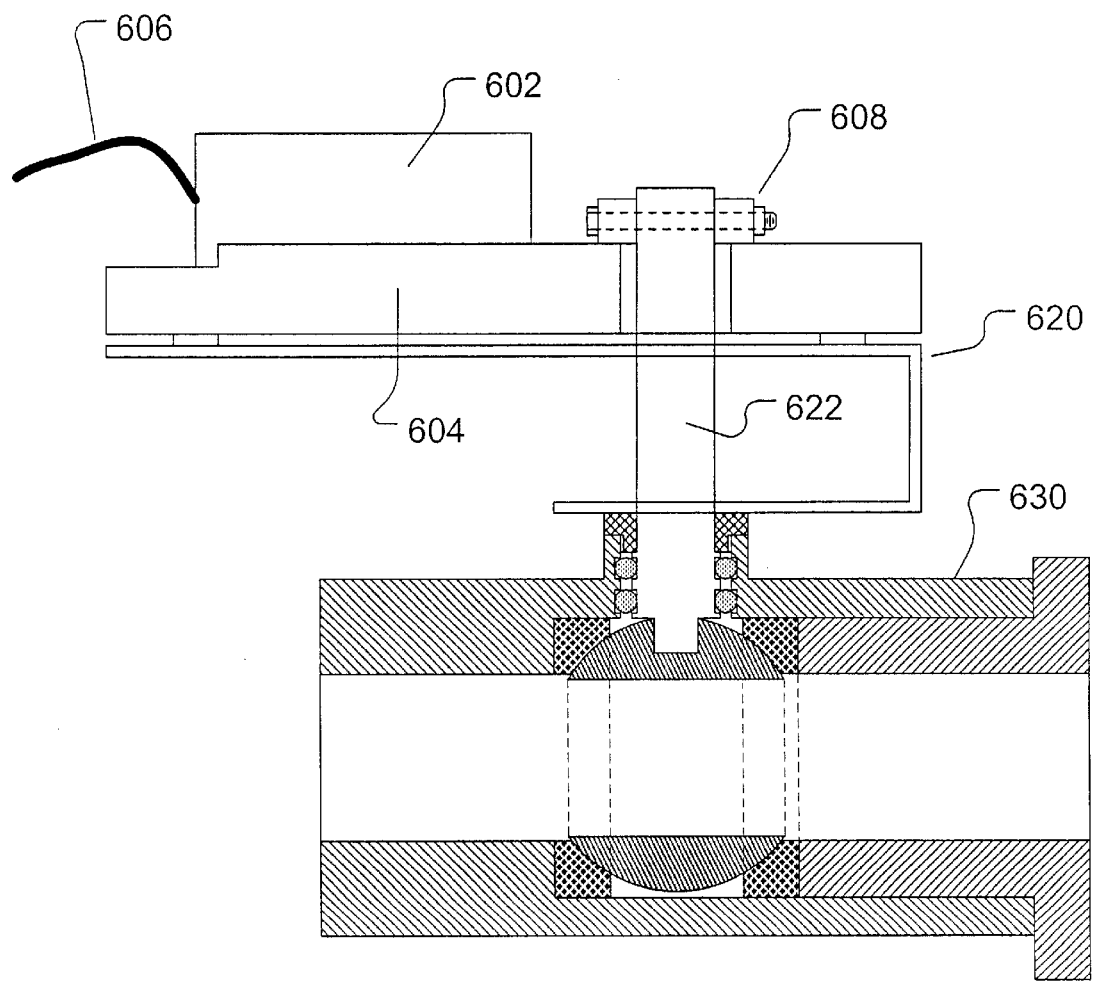
FIG. 6 shows a typical application for an electric actuator of the preset invention in the context of a ball-valve assembly.

FIG. 6 represents a modulating ball valve of the type that may be employed to modulate heated or chilled water in the configuration shown in FIG. 1. In FIG. 6, a ball valve 630 is modulated by rotating the ball valve shaft 622. To modulate the valve, an electric actuator 604 is attached to the valve via a mounting bracket 620 and the actuator drive is connected to the ball valve shaft via a clamp 608 that may consist of a vise type clamp as shown, a set screw, a pin through the shaft, or by some other means.

The electric actuator is connected to the controller from which it receives position command signals via a cord 606, which also supplies power to the actuator. A reversible electric motor and the logic to operate it in response to position signals are located in a protective housing 602 and the gear train that reduces the motor output speed and multiplies the torque is located in the main housing beneath the electric motor.

Several different methods of transmitting a position command signal from the controller to the actuator can be employed, but the most common is through the use of a variable direct current voltage or current. In this way, a continuous signal voltage or current is provided to the actuator. Logic, usually microprocessor based, within the actuator converts the voltage to a position signal and maintains a record of the current position of the actuator by counting rotations of the motor or by other means known in the art. Anytime the voltage changes, the logic automatically starts the motor in the direction required and operates it such that the actuator position is adjusted to correspond to the new position indicated by the level of the voltage or current signal from the controller.

In many prior art actuators, logic is employed to first test to see if the new position signal from the controller is sufficiently greater or lower than the existing actuator position to warrant a reposition. If it is not, the actuator is not repositioned until the signal from the controller is sufficiently large or small to meet this limit. This is the type of system represented by FIG. 4. The preferred embodiment of this invention involves substituting existing reposition limiting logic with the logic shown in FIG. 2. Accordingly, the repositioning can only occur at preset time intervals; and the decision as to whether or not a reposition at such an interval should be initiated depends on the absolute value of the sum of the difference between position command signals received over time since the last reposition and the current actuator position.

It will be obvious to those having skill in the art that many changes may be made to the details of the above-described embodiments of this invention without departing from the underlying principles thereof. The scope of the present invention should, therefore, be determined only by the following claims.

What is claimed is:

1. A method for controlling a modulating valve so as to reduce the frequency of valve repositions, the method comprising the steps of:
    selecting a threshold differential value as a prerequisite to repositioning the modulating valve;
    receiving an initial position command signal;
    receiving a valve actuator position signal;
    comparing the initial position command signal and the valve actuator position signal to determine an actual differential value; and
    if the actual differential value does not exceed the threshold differential value, storing the actual differential value as a total differential value without repositioning the modulating valve.

2. The method of claim 1 further comprising the steps of:
    periodically receiving at least one subsequent position command signal; and
    for each subsequent position command signal:
        comparing the subsequent position command signal to the valve actuator position signal to determine a corresponding subsequent differential value;
        aggregating the corresponding subsequent differential value to the total differential value; and
        repositioning the modulating valve if the aggregated total differential value exceeds the threshold differential value.

3. A method for controlling an actuator so as to reduce the frequency of actuator repositions, thus extending the life of the actuator, the method comprising the steps of:
    selecting a threshold position command differential value;
    receiving an actuator actual position signal;
    receiving a position command signal;
    determining an actual differential value between the actuator actual position signal and the position command signal;
    if the actual differential value exceeds the threshold differential value repositioning the actuator according to the position command signal; and
    if the actual differential value does not exceed the threshold differential value:
        repeating the steps of receiving a position command signal and determining an actual differential value;
        aggregating the actual differential values so as to determine an aggregated differential value since the actuator was last repositioned; and
        repositioning the actuator if the aggregated differential value exceeds the threshold differential value.

4. The method of claim 3 further comprising the step of resetting the aggregated differential value after repositioning the actuator.

5. The method of claim 3 further comprising the steps of:
    if the aggregated differential value does not exceed the threshold differential value:
        receiving at least one subsequent position command signal; and
        for each subsequent position command signal:
            comparing the subsequent position command signal to the actuator actual position signal to determine a corresponding subsequent differential value;
            updating the aggregated differential value to include the subsequent differential value; and
            repositioning the actuator if the updated aggregated differential value exceeds the threshold differential value.

6. The method of claim 5 wherein the step of receiving at least one subsequent position command signal occurs periodically.

7. The method of claim 5 wherein the repositioning of the actuator is according to the last received position command signal.

8. A method for controlling an actuator so as to reduce the frequency of actuator repositions, thus extending the life of the actuator, the method comprising the steps of:
    designating a threshold position command differential value;

designating a minimum reposition interval;

receiving an actuator actual position signal;

receiving a first position command signal;

determining a first differential value between the actuator actual position signal and the first position command signal;

after the minimum reposition interval, receiving a second position command signal;

determining a second differential value between the actuator actual position signal and the second position command signal;

determining a total differential value by aggregating the first differential value and the second differential value; and if the total differential value exceeds the threshold differential value, repositioning the actuator according to the second position command signal.

9. The method of claim 8, further comprising the steps of:

if the total differential value does not exceed the threshold differential value:

receiving at least one additional position command signal; and for each additional position command signal:

comparing the additional position command signal to the actuator actual position signal to determine an additional differential value;

aggregating the additional differential value with the total differential value to determine a next total differential value; and repositioning the modulating valve once the next total differential value exceeds the threshold differential value.

* * * * *